Oct. 14, 1952     C. E. MOSLEY     2,614,189
CURRENT LIMITER

Original Filed Aug. 12, 1948

Carl E. Mosley,
Inventor.
Haynes and Koenig,
Attorneys.

Patented Oct. 14, 1952

2,614,189

UNITED STATES PATENT OFFICE 2,614,189

CURRENT LIMITER

Carl E. Mosley, Overland, Mo., assignor to W. N. Matthews Corporation, St. Louis, Mo., a corporation of Missouri Original application August 12, 1948, Serial No. 43,890, now Patent No. 2,518,361, dated August 8, 1950. Divided and this application November 28, 1949, Serial No. 129,775

3 Claims. (Cl. 200—113)

This invention relates to current limiters, and more particularly to a thermostatic current limiter for use in a power distribution system to limit the amount of current drawn by an individual consumer.

This application is a division of my copending application for Current Limiter, Serial No. 43,890, filed August 12, 1948, and which has resulted in Patent No. 2,518,361, dated Aug. 8, 1950.

Among the several objects of the invention may be noted the provision of a current limiter for disconnecting a load element energized by a consumer's wiring system without disconnecting the remainder of the load elements to place a limit upon the current drawn by the consumer; the provision of a current limiter of the class described particularly adapted to disconnect an electrical household appliance or appliances, such as a hot water heater for example, whose operation may be discontinued at peak loads without excessive inconvenience to the consumer, without disconnecting other more essential load elements such as the lights; the provision of a current limiter of this class which by reason of limiting the load drawn by the consumer affords a practical means for affording the consumer "off-peak" current rates; and the provision of a current limiter such as described which is economical in construction and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a front elevation of the current limiting device of the present invention;

Similar reference characters indicate corresponding parts throughout the several views of the drawings.

Figure 1:
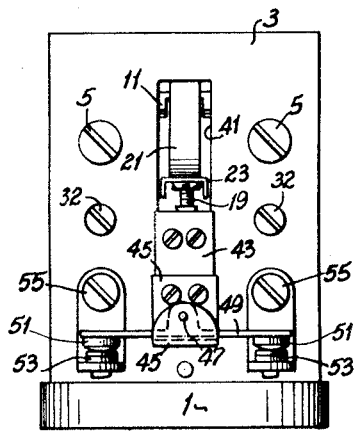

Power companies can afford to sell current at reduced rates to consumers whose local loads do not contribute to costly peak demands. Ordinarily the load contributed by a home or the like contributes to peak demand by portions which might be eliminated without excessive inconvenience to the customer. Other portions such as lighting load and the like normally cannot conveniently be eliminated. A part of the load which may be dispensed with is that caused for example by a hot water heater. If a customer can be induced to reduce the dispensable part of the load when his over-all load is high a power company can afford to give such a customer reduced power rates.

By means of the present invention, a maximum limit is placed upon the customer's total load. If this limit is exceeded, a dispensable part of the load, such as the load due to the operation of an electric water heater or similar appliance, may be automatically disconnected to reduce the load below the limit, without disconnecting more essential portions of the load. This is accomplished by providing a thermostat in series with the customer's load and having the thermostat control a switch supplying the dispensable fraction of the load. It is arranged so that this fraction of the load will be the first to be affected by a demand in excess of the predetermined amount. The circuit section carrying this dispensable fraction part of the load only will be cut off without affecting the load in the remainder of the customer's circuit, and without cutting off the latter. However, if the customer should want this dispensable fraction of the load returned to service, this can be accomplished by the customer reducing the remainder of his load to bring it below the predetermined amount, whereupon he will have reinstated his dispensable load.

Referring now more particularly to the drawings, numeral 1 indicates an insulating base upon which is mounted an insulation panel 3 carrying main line terminals 5. Numeral 7 in general indicates an E-shaped thermostatic member. This member is formed from a sheet of electrically conductive composite thermostat metal so as to have outer legs or blades 9, a central leg or blade 11 having substantially the same temperature-response characteristics as the outer blades 9, and a conductive connecting part or member 13. The ends of the legs 9 are anchored to the terminals 5. The high coefficient of expansion element of the thermostat is on top, being numbered 15. The low coefficient of expansion element is on the bottom, being numbered 17. If a circuit is closed across the terminals 5, current will flow through the outer legs 9 and connecting part 13 but will not flow through the leg or blade 11 which is isolated from flow of current therethrough and, as will appear, functions simply as a mechanical extension.

Figure 2:
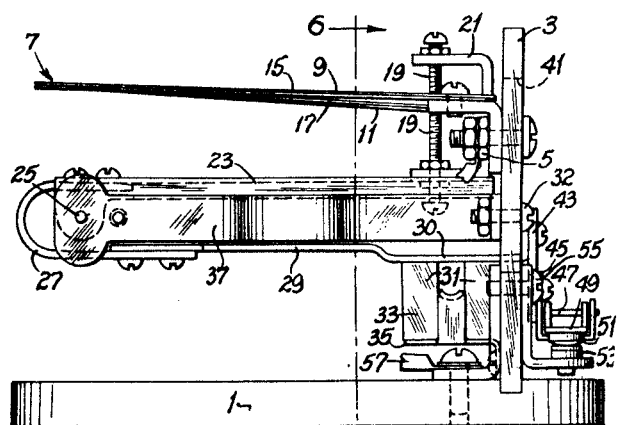
Fig. 2 is a side elevation viewed from the left of Fig. 1.
Figure 3:
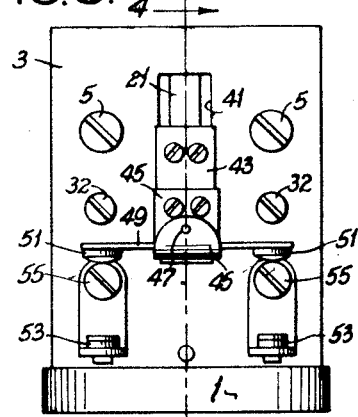
Fig. 3 is a view similar to Fig. 1 but showing an alternate position of parts.
Figure 4:
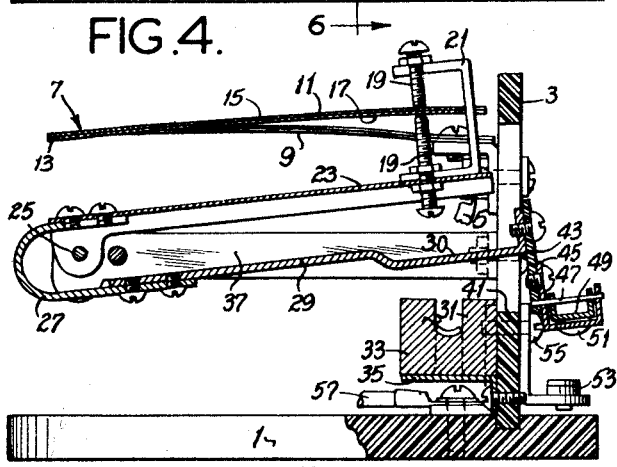
Fig. 4 is a longitudinal section taken on line 4—4 of Fig. 3.
Figure 6:
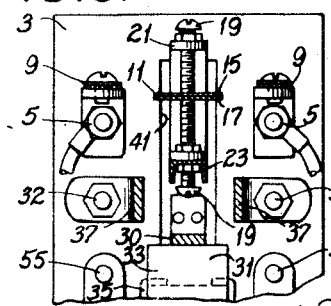
Fig. 6 is a vertical section taken on line 6—6 of Fig. 2.
Figure 5:
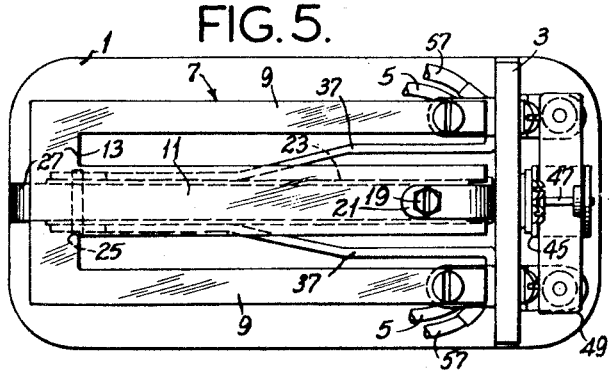
Fig. 5 is a top plan view of Fig. 2.

In its cold condition the thermostatic element is as shown in Figs. 1 and 2. In its hot overload condition it will assume a position such as shown in Figs. 3 and 4. Its hot condition is brought about by excessive current flow. In the cold condition the leg 11 is down; in the hot condition this leg is up.

The outer end of the leg 11 is engaged on opposite sides by adjusting set screws 19. These are threaded through a fork 21, the latter being attached to a rigid arm 23 pivoted at 25. Attached to the arm 23 is a spring loop 27 to which in turn is fastened a rigid arm 29 composed of magnetic material. The outer end of arm 29 forms an armature 30 adapted to be attracted to the poles 31 of a U-shaped permanent magnet 33. This magnet is supported by means of a bracket 35 upon the insulating panel 3. The pivot 25 is in a U-shaped bracket 37 which is secured to the panel 3 as by bolts 32.

The armature 30 extends through a slot 41 in the panel 3. Here it is provided with an insulating plate 43 which supports a clip 45. A pivot 47 on the clip supports a switch arm 49 having contacts 51 engageable with auxiliary line contacts 53. The contacts 53 are mounted upon the panel 3. The mounting bolts 55 therefor reach through the panel and form an attachment for auxiliary line terminals 57. These line terminals 57 are exclusively in the part of the circuit serving the dispensable current consuming appliance.

Figure 7:
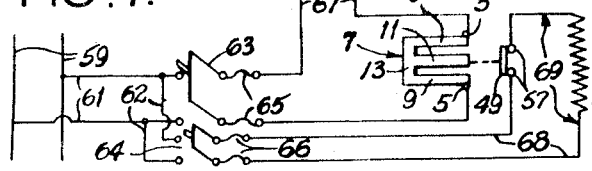
Fig. 7 is a wiring diagram.

Fig. 7 illustrates one method of connecting the device to produce the desired results. Exterior power lines 59 feed a general service branch circuit including lines 61, a line switch 63 and fuses 65. The service feeds to the wiring system 67 of the premises. The E-shaped thermostatic element 7 is connected between the service circuit and the premises circuit in series with the general load of the premises, represented by load elements 71. Thus, the net current drawn by the consumer in operating the general appliances 71 flows through the thermostatic legs 9. A special appliance, for example an electric water heater indicated at 69, is supplied by a special premises circuit including lines 62 connected across the service lines 61, a line switch 64, fuses 66, wires 68 and the switch arm 49. The line terminals 5 and the auxiliary terminals 57 of the device are indicated. It will be noted that current for the special appliance does not pass through the thermostatic element inasmuch as the special appliance is connected ahead of the thermostatic element and in parallel with the thermostatic element.

At any current value below a predetermined maximum load, the thermostatic element 7 does not move from its Fig. 2 position far enough to open the contacts 57. However, when this load is exceeded, the current value is sufficient that this element 7 moves from the Fig. 2 to the Fig. 4 position. The connecting member 13 is angled by the flexing of the outer blades 9 and the central blade 11 is thereby angled. This causes the arm 11 to lift. This raises the upper arm 23 of the U-shaped assembly 23, 27 and 29. Since the armature 30 is held against the poles 31 of the magnet 33, tension is placed in the spring 27. This results in a delayed withdrawal of the armature from the poles 31 until a tension is reached in the spring 27 which causes the armature to break away from the poles 31 with a snap action. This also draws up the switch arm 49 with a snap action, thus suddenly breaking the connection between the terminals 57. This disconnects the dispensable hot water heater part of the appliance branch circuit 62 but does not interfere with the supply of current to the remainder of the load elements 71.

At any time that the current drawn by load elements 71 drops sufficiently to bring the current value to below said predetermined amount, the thermostatic element 7 cools and takes the position shown in Fig. 2, thus reclosing the heater load circuit 69. Thus, if due to excessive load at 71 a customer's water heater 69 has been cut off, he may reinstate operation of the water heater by reducing the load at 71. The customer has an option in this respect, but if he does nothing he is only without the most dispensable of the various current consuming devices in the house circuit.

The peak current which the device of the present invention will carry without opening the switch (arm 49) may be conveniently adjusted by rotation of the upper and lower screws 19. For example, if it is desired to cause the switch to open at a lower peak current value, the screws 19 are both moved downward until the switch opens at this new lower peak current value.

The form of the E-shaped thermostatic element 7 is particularly suitable for this device because it provides not only the thermostatic legs 9 for the series connection through the connecting part 13, but also the operative part 11 functions in the manner of a crank acting through a mechanical linkage for translating to the switch the thermostatic motion which is obtained from the outer legs of the thermostat and for compensating ambient temperature variations. This motion taken in connection with the quick-release magnetic means for the switch 49 assures a large throw for the switch and a quick break, thus inhibiting arcing and decreasing contact deterioration. Also, the construction provides ambient-temperature compensation. If outer legs 9 tend to flex under the influence of external heat, the middle leg 11 also is influenced by said heat and changes its shape in a like manner to counteract the flexing of legs 9.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. In combination, a support, a pair of electrically conductive thermostatic blades each fixed at one end to the support and extending therefrom generally in coplanar side-by-side relation, an electrically conductive connecting member spanning the free ends of said blades and electric terminals at the fixed ends of said blades providing an electric circuit through said blades for electrical heating thereof, each of said pair of blades being formed of composite thermostat metal so that they flex and angle the connecting member when they are heated, a third thermostatic blade extending from the connecting member in spaced side-by-side relation with respect to said pair of thermostatic blades and adapted for angling movement with the connecting member, said third blade being formed of composite thermostat metal having substantially the same temperature-response characteristics as said pair of blades and isolated from flow of current therethrough, and a switch operated by and electrically insulated from the free end of said third blade.

2. In combination, a support, a pair of electrically conductive thermostatic blades each fixed at one end to the support and extending therefrom generally in coplanar side-by-side relation, an electrically conducting connecting member spanning the free ends of said blades and electric terminals at the fixed ends of said blades providing an electric circuit through said blades for electrical heating thereof, each of said pair of blades being formed of composite thermostat metal so that they flex and angle the connecting member when they are heated, a third thermostatic blade extending from the connecting member in spaced side-by-side relation with respect to said pair of thermostatic blades and adapted for angling movement with the connecting member, said third blade being formed of composite thermostat metal having substantially the same temperature-response characteristics as said pair of blades, and a snap-acting switch operated by and electrically insulated from the free end of said third blade through a linkage including a spring member connecting the free end of said third blade to said snap-acting switch, said spring member permitting limited movement of the free end of said third blade before switch actuation occurs, and an adjusting screw engaging the third blade for variably prestressing the spring member.

3. In combination, a support, an outer pair of electrically conductive thermostatic blades each fixed at one end to the support and extending therefrom in coplanar spaced parallel relation, an electrically conductive connecting member spanning the free ends of said blades and electric terminals at the fixed ends of the blades providing an electric circuit through the blades for electrical heating thereof, said blades being formed of composite thermostat metal so that they flex and angle the connecting member when they are heated, and a central thermostatic blade extending from the connecting member between said outer blades in spaced normally coplanar relation and adapted for angling movement with the connecting member, said third blade being formed of composite thermostat metal having substantially the same temperature-response characteristics as said outer thermostatic blades and isolated from flow of current therethrough, and a switch operated by and electrically insulated from said central blade.

CARL E. MOSLEY.

REFERENCES CITED

The following references are of record in the file of this patent:

UNITED STATES PATENTS

| Number | Name | Date |
|---|---|---|
| 1,214,101 | Wessel | Jan. 30, 1917 |
| 1,849,280 | Chandler | Mar. 15, 1932 |
| 1,995,635 | Clark | Mar. 26, 1935 |
| 2,171,895 | Sardeson | Sept. 5, 1939 |
| 2,280,960 | Lee | Apr. 28, 1942 |
| 2,284,383 | Elmer | May 26, 1942 |
| 2,302,399 | Stimson | Nov. 17, 1942 |